Oct. 13, 1942.  J. NICOL  2,298,773
VEHICLE
Filed June 13, 1940   10 Sheets-Sheet 4

Oct. 13, 1942.    J. NICOL    2,298,773
VEHICLE
Filed June 13, 1940    10 Sheets-Sheet 6

Fig. 11

Inventor
John Nicol
By
Strauch & Hoffman
Attorneys

Oct. 13, 1942.   J. NICOL   2,298,773
VEHICLE
Filed June 13, 1940   10 Sheets-Sheet 8

Inventor
John Nicol
Strauch & Hoffman
Attorneys

Oct. 13, 1942.  J. NICOL  2,298,773
VEHICLE
Filed June 13, 1940   10 Sheets-Sheet 9

Inventor
John Nicol
By
Strauch & Hoffman
Attorneys

Oct. 13, 1942.   J. NICOL   2,298,773
VEHICLE
Filed June 13, 1940   10 Sheets-Sheet 10

Inventor
John Nicol
By Strauch & Hoffman
Attorneys

Patented Oct. 13, 1942

2,298,773

UNITED STATES PATENT OFFICE 2,298,773

VEHICLE

John Nicol, Detroit, Mich., assignor to Divco-Twin Truck Company, Detroit, Mich., a corporation of Michigan Application June 13, 1940, Serial No. 340,395

3 Claims. (Cl. 296—35)

This invention relates to vehicles and methods of assembling them and is especially concerned with improved constructional features and methods of assembly employed in mounting special bodies on automobile chassis.

The present invention, in its preferred embodiment, will be particularly described with reference to mounting an elongated, wide delivery truck body of large storage capacity upon a stock chassis of conventional model, but the scope of the invention is not limited to such.

Special delivery truck bodies have heretofore been mounted upon stock chassis, but most of these prior vehicles and methods of assembly are objectionably expensive because it has heretofore been considered necessary to build a special sub-frame beneath the front end of each chassis to permit mounting of the body thereon and to embody costly and complicated rearrangements of the steering gear, brake and clutch pedals and other vehicle controls.

In all of these prior vehicles and methods of which I have present knowledge, the front fenders are removed entirely from the stock chassis and discarded, and the body which is mounted upon the stripped chassis includes special front fenders which are part of the body construction, which adds materially to the expense of such vehicles.

With the above state of the art in mind, it is a major object of the present invention to provide a novel vehicle and method of assembling it by combining a special elongated body with a chassis, usually a stock chassis, with a minimum of alteration of the chassis so that the complete vehicle may be assembled inexpensively and quickly.

It is a further object of the invention to provide a novel vehicle and method of making it by assembling a special relatively wide, elongated, large capacity truck body upon a chassis wherein the usual front fenders are retained on the chassis and the front end of the body is rigidly secured to those fenders which thereby comprise structural members strengthening the front end of the body, and wherein the body itself is sufficiently rigid to afford definite reenforcement for the fenders to keep them from weaving during operation of the vehicle.

A further object of the invention is to provide a novel vehicle combination of a special wide body upon a stock chassis wherein the front end of the body is tied directly to the usual front fenders of the chassis and wherein a continuous flexible sealing strip is secured between suitably formed lower edges of the body walls and the upper surface of each of the front fenders.

It is a further object of the invention to provide a vehicle body and chassis combination wherein the body is of such length that it extends forwardly over the major part of an engine supported on the front end of the chassis and wherein the interior front end of the body above and adjacent the engine is of novel construction so as to house the engine and provide a maximum of cargo and other front floor space.

A further object of the invention is to provide novel combined vehicle body and chassis construction wherein the body is of such length that it extends over and at least partly houses the forwardly disposed engine and having novel engine cover and elevated loading floor arrangements within the front end of the body. Preferably a section of the loading floor is a hinged trap door openable for access to the engine for minor repair and like purposes and the engine cover is removable as a unit for major repairs.

It is a further object of the invention to provide novel delivery vehicle or like construction wherein the front end of the body is tied directly to the usual front fenders of the chassis and at least one of the front fenders serves as flooring at the adjacent front corner of the body.

A further object of the invention is to provide a novel special pedal bracket assembly for relocating the vehicle control pedals forwardly of their usual position on a stock chassis when the latter is combined with an elongated body, wherein the pedal bracket is secured rigidly to a main longitudinal member of the chassis and special reenforcing means, such as a rigid gusset plate bridged between adjacent chassis members, is provided for reenforcing the main longitudinal chassis member against twisting due to forces set up when the driver steps on a pedal.

Further objects of the invention will presently appear as the description of the invention proceeds in connection with the appended claims and the annexed drawings in which:

Referring to Figures 1–5 the vehicle of the invention comprises a special wide elongated box-like body 11 of large storage capacity mounted directly upon a stock chassis 12. The chassis illustrated in the drawings is a Chevrolet stock chassis but the body can be fitted to practically any desired chassis.

Chassis 12 comprises the usual pair of main longitudinal rails 13 and 14 rigidly held together by a series of parallel cross members mainly indicated at 15, 16, 17 and 18.

Chassis 12 is connected by suitable springs to the usual front and rear axles whose opposite ends are supported by front wheels 19 and rear wheels 20, respectively. The usual front fenders 21, 21' which are regarded in the trade as part of the stock chassis over-hang front wheels 19.

At the front end of the chassis, the usual engine hood 22 is shortened by removal of its rear portion and interfits with the special body as will be described later. One upper side panel 23 of hood 22 is hinged at 24 along the central axis of the vehicle for access to the radiator and front end of the engine. Except for the shortened hood and the special pedal bracket and reenforcing gusset plate later described, chassis 12 is corporated into the vehicle substantially as it is obtained from stock.

Box-like body 11 is sufficiently wide to extend laterally over rear wheels 20 (Figure 2) and of sufficient length and width at its front end to extend forwardly over the greater portion of the engine and overhang front fenders 21 and 21'.

Body 11 comprises mainly a rear floor unit 25, a pair of side units 26 and 27, a roof unit 28 and a front end unit 29. Each of these units is independently manufactured on accurate jigs and then incorporated into the body on an assembly line wherein the rear floor unit, side units, front end unit and roof unit are secured together in the order named. Preferably these units are manufactured and assembled into a sturdy all-steel body by the methods and apparatus described and claimed in my copending application Serial No. 296,512 filed September 25, 1939.

Figure 1:
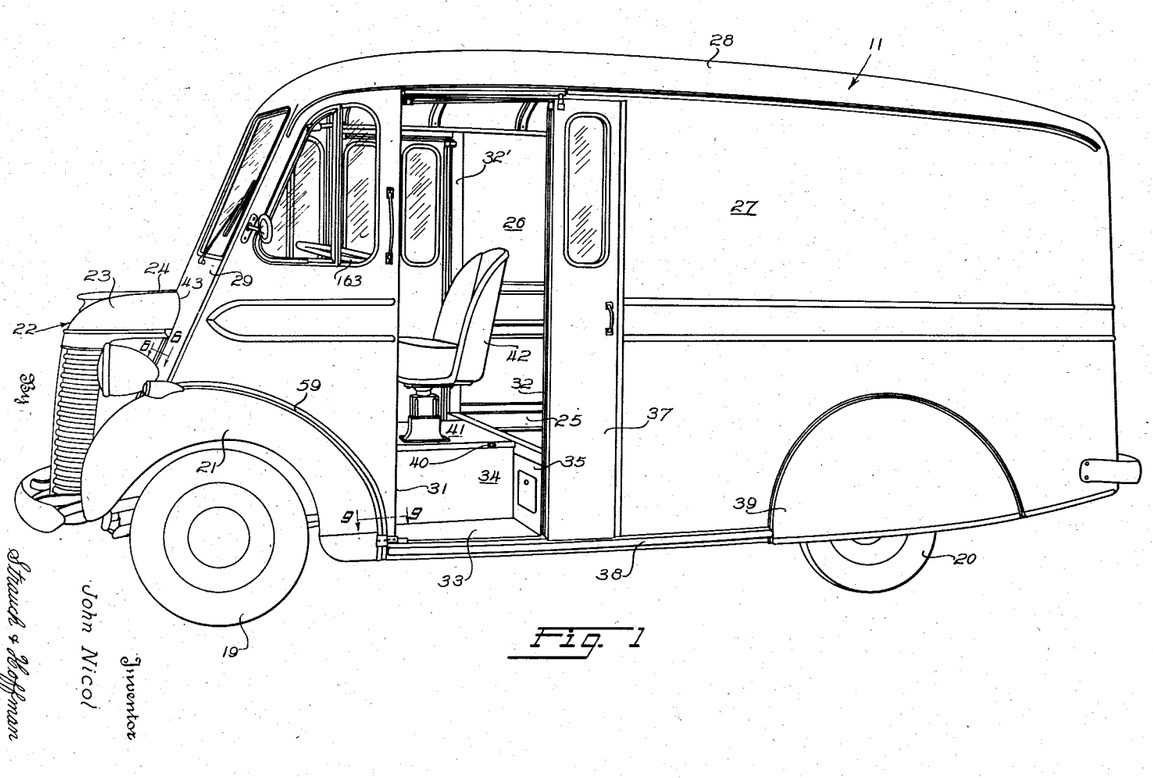
Figure 1 is a side elevation of a complete vehicle constructed according to the invention.
Figure 2:
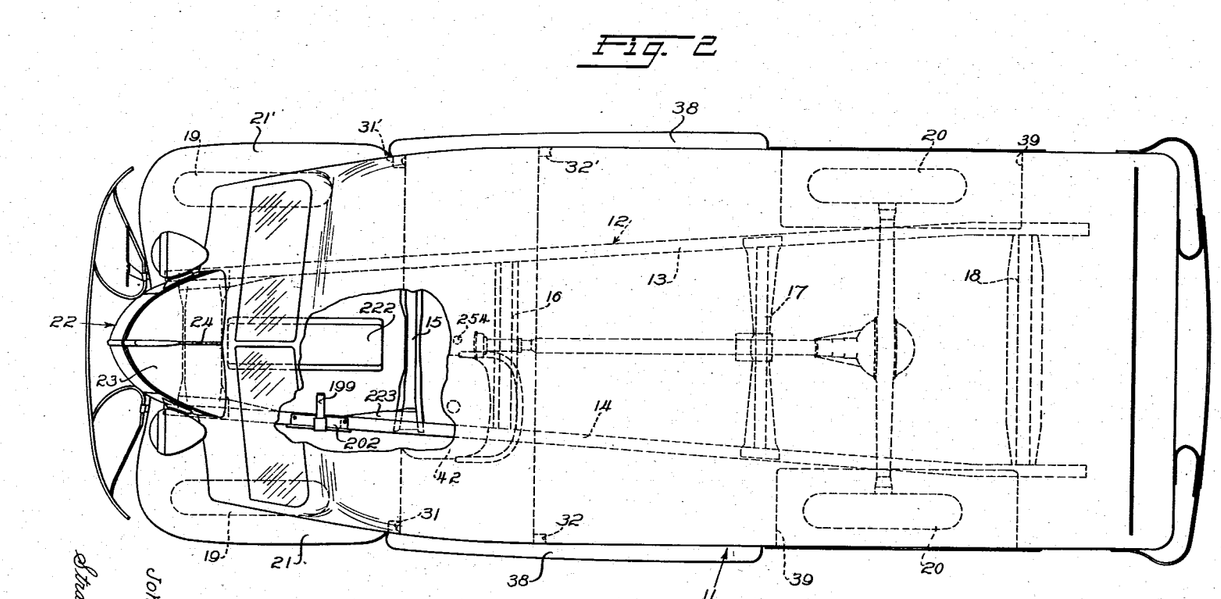
Figure 2 is a top plan view of the vehicle of Figure 1, partially broken away to show the special pedal bracket and the gusset plate for reenforcing the frame.

As illustrated in Figures 1 and 2, body 11 is provided at the driver's entrance side with a side doorway defined by parallel vertical front and rear door posts 31 and 32 and opening to a low floor 33 within the body. Floor 33 is disposed in a horizontal plane below the axes of wheels 19 and 20 and only a single short step above the ground upon which the wheels rest, and is spaced sufficiently from roof 28 to permit an operator to stand upright thereon within the body.

Floor 33 extends inwardly to a vertical panel 34 adjacent chassis rail 14. A vertical rear panel 35 connects post 32 to the rear end of panel 34 and a vertical front panel 36 (Figure 10) connects post 31 to the front end of panel 34. These three vertical panels and floor 33 are preferably welded together at adjacent edges before assembly into the body and provide a low step well within the body which is closed by a suitable folding door 37. A narrow running board 38, disposed at the level of floor 33, is secured to the body by suitable brackets and extends along the outer body side from front door post 31 to the rear wheel housing arch 39. Identical low floor step well and running board arrangements are preferably provided at the opposite side of the body between front and rear door posts 31' and 32'. Step well panels 34 are bridged above chassis rails 13 and 14 by an intermediate floor 41 to which they are secured at their rear portions as by bolts 40. A suitable driver's seat 42 is rotatably and vertically adjustably supported above floor 41 and directly above rail 14 so as to be aligned with the vehicle controls.

Body 11 is preferably the same as that described in my copending application Serial No. 333,661 filed May 6, 1940, of which the present application is a continuation-in-part, wherein additional novel features thereof are described and claimed.

The front wall of body 11 is apertured at 43 to interfit with shortened hood 22, and the lower edges of the body front and side walls are shaped to the contour of the upper surfaces of front fenders 21, so that when the complete body unit 11 is dropped on the chassis it settles directly into proper position.

Preferably the front body wall is flanged outwardly at 22' (Figure 3) beneath the upper part of the rear edge of hood 22 to provide a support therefor and form a water drain.

Figure 10:
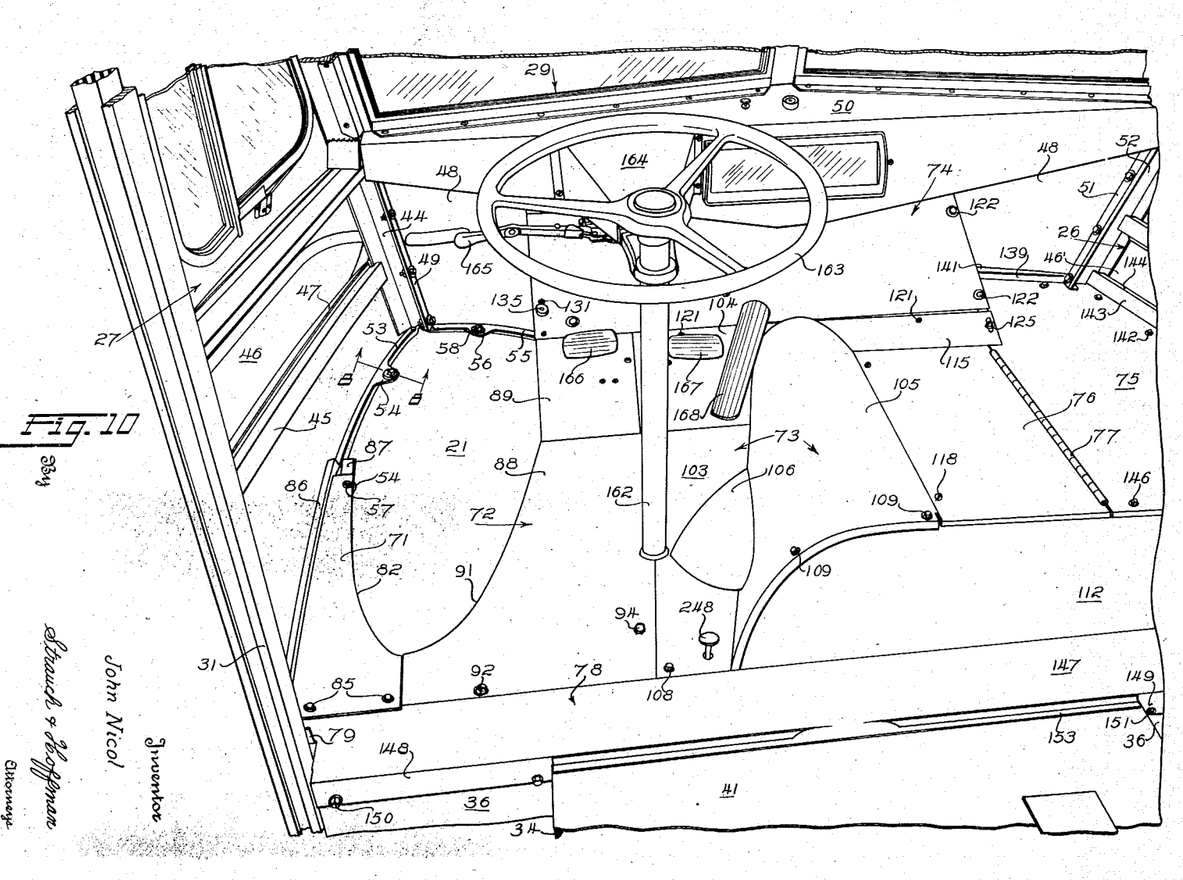
Figure 10 is a photographic view of the interior front end of the vehicle of Figure 1, illustrating the manner in which the body is secured to the front fenders and further illustrating the novel front floor and engine cover construction.

With reference to Figure 10, that portion of side unit 27 which lies forwardly of the doorway comprises front door post 31, inclined front body corner post 44 and a horizontal panel strainer 45.

Front body side panel 46 is welded to posts 31 and 44 and the front end of the roof rail (not shown), and a slab of sponge rubber 47 is provided between strainer 45 and the interior surface of the panel. Strainer 45 is inherently outwardly bowed and compresses slab 47 against the panel so as to provide a sweep or crown to the body wall and prevent body noises. Preferably the opposite ends of strainer 45 are welded to posts 31 and 44 after the remainder of the skeleton frame of unit 27 has been welded together and panel 46 has been welded securely upon the frame.

Body front end unit 29 comprises an inclined generally V-shaped lower wall 48 provided with opposite side flanges 49 and 51 for bolting it to post 44 and opposite front body corner post 52 of side unit 26.

Front end unit 29 also comprises a rigid, sturdy instrument board carrying beam 50 which during assembly of the body is welded at opposite ends to corner posts 44 and 52 and serves as a lateral body strengthening member in the same manner as the instrument board described and claimed in my United States Letters Patent No. 2,233,323, granted February 25, 1941.

The lower edge of body side wall 46 is inwardly flanged at 53 (Figure 10) and provided with spaced apertured lugs 54. Similarly the lower edge of front body wall 48 is inwardly flanged at 55 and provided with spaced apertured lugs 56. Suitable bolt assemblies 57 and 58 are provided for rigidly securing the lower edges of the body walls directly to fender 21.

Figure 11:
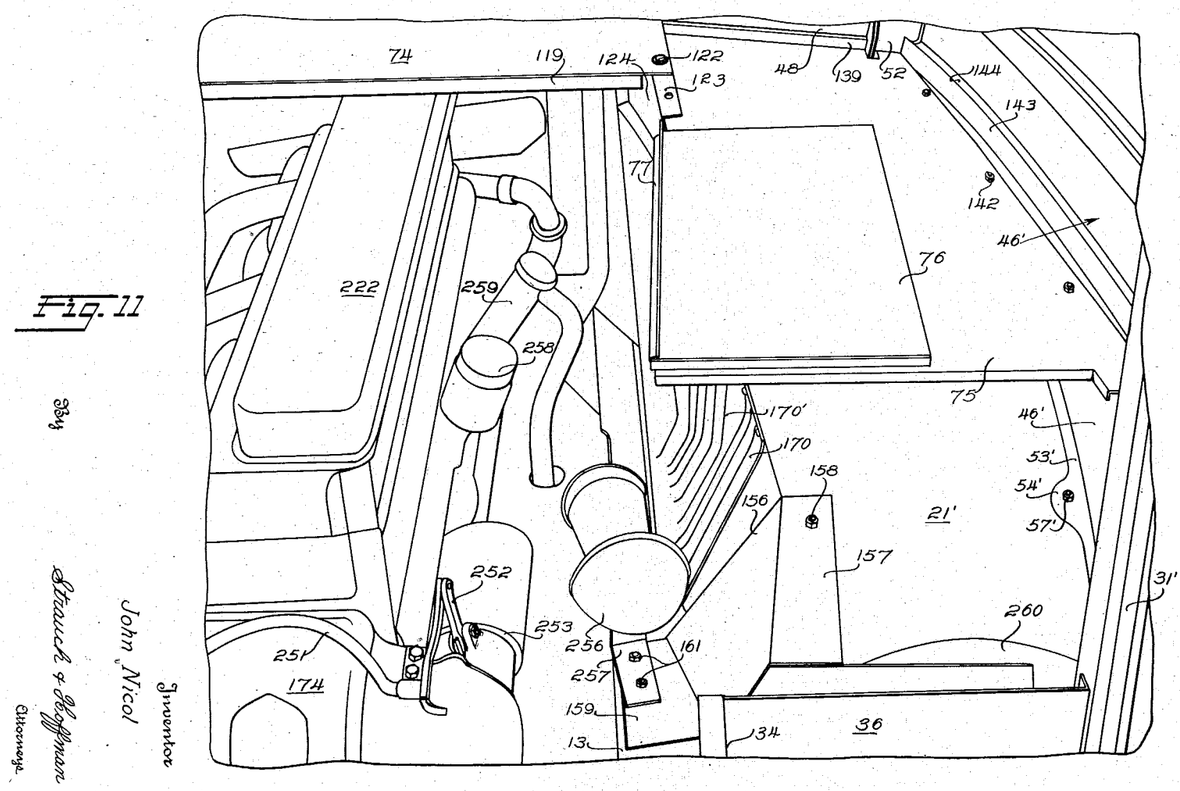
Figure 11 is an enlarged photographic view of the right side of the front end interior of the vehicle illustrating the front storage floor and engine trap door arrangements.

As illustrated in Figure 11, the front side body wall 46' of unit 26 is flanged inwardly at 53' and provided with spaced lugs 54' through which extend bolt assemblies 57'. The right side of wall 48 is secured to fender 21' in the same manner as the left side is secured to fender 21.

In order to prevent undesirable metal-to-metal contact and provide a water and dust-tight joint between the body front and side walls and fenders 21 and 21', continuous flexible sealing strips 59 and 59' of special design are provided. Preferably these strips are of soft tough rubber molded in generally T-shaped cross-section and comprising a body portion 61 provided at one end with integral arcuate wings 62 and 63 normally inclined at an acute angle with respect to the body portion. A longitudinal groove 64 between the wings contributes to their flexibility and provides an effective hinge area therefor.

Figure 3:
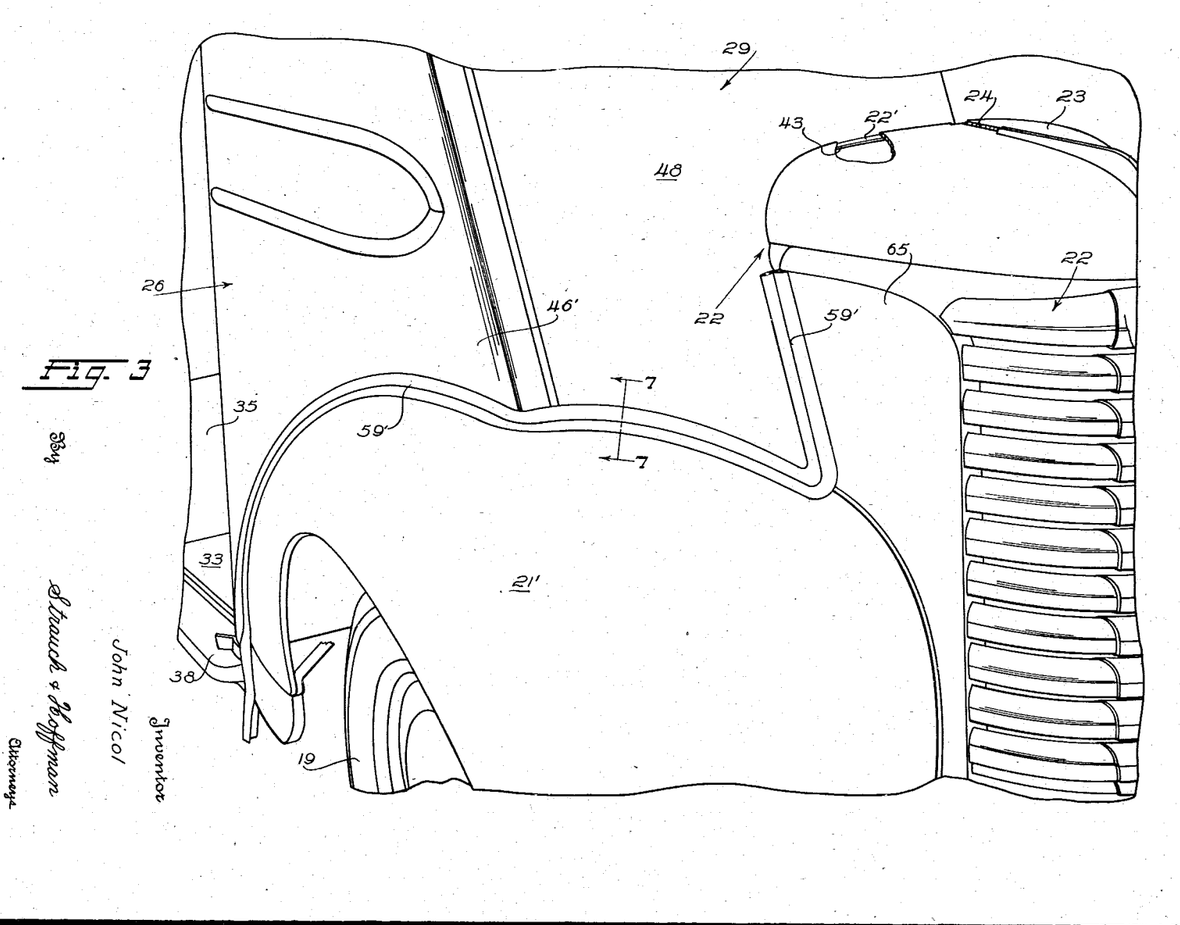
Figure 3 is an enlarged perspective view of the right front corner of the vehicle of Figure 1 illustrating the joint between the body and the fender.

Referring to Figure 3, strip 59' extends from the top of adjacent engine hood side panel 65 downwardly and forwardly between wall 48 and panel 65 to the juncture of panel 65, wall 48 and fender 21' and then laterally outwardly and rearwardly along the intersection of the body front and side walls and fender 21' to terminate below adjacent running board 38. Strip 59 is similarly mounted at the other side of the vehicle.

Figures 4, 5, 6, 7, 8, 9:
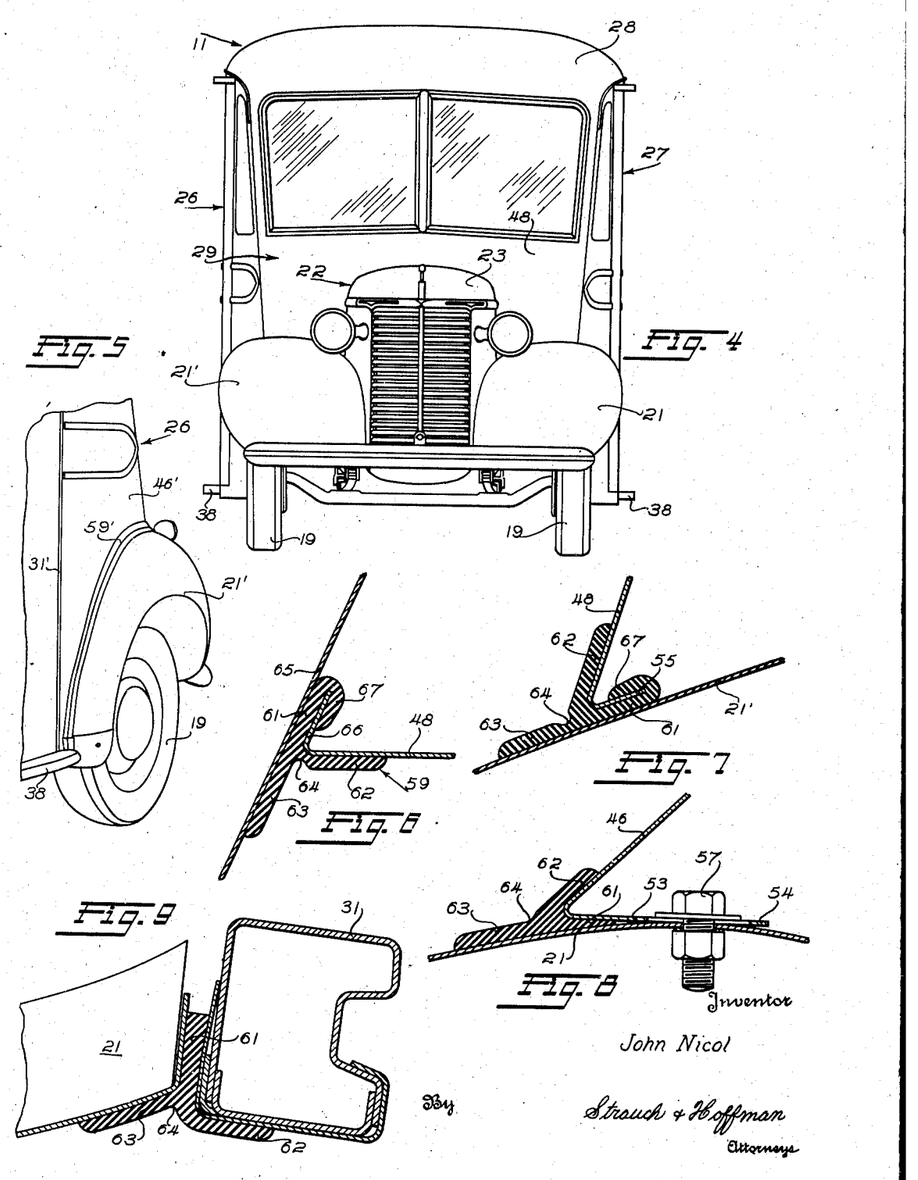
Figure 4 is a front elevation of the vehicle of Figure 1.
Figure 5 is a photographic rear side view illustrating further the joint between the vehicle body and right front fender.
Figure 6 is a section taken along line 6—6 of Figure 1.
Figure 7 is a section taken along line 7—7 of Figure 3.
Figure 8 is a section taken generally along line 8—8 of Figure 10.
Figure 9 is a section taken along line 9—9 of Figure 1.

With reference to Figure 6, body portion 61 of the strip is clenched between panel 65 and an inturned vertical flange 66 along aperture 43 in wall 48. Preferably the strip is formed with an integral resilient lip 67 hooked over flange 66.

In Figure 7, body portion 61 of strip 59' is shown clenched between the upper surface of fender 21' and flange 55 along the lower edge of wall 48. Lip 67 is hooked over flange 55.

In Figure 8, body portion 61 of strip 59 is shown clenched between fender 21 and flange 53 at a region of maximum compression where the body wall is bolted to the fender.

In Figure 9, body portion 61 of strip 59 is shown clenched between the rear part of fender 21 and front door post 31 adjacent running board 38.

Two continuous flexible strips are employed in each vehicle. Each of these strips is attached to the completed body unit before assembly with the chassis by means of resilient lip 67 which has sufficient gripping force to retain the strip on the body as it is being dropped on the chassis and while bolts 57, 57' and 58 are being tightened. Lip 67 is of course removed adjacent lugs 54, 54' and 56 and at the door post as shown in Figure 9.

When strips 59 and 59' are secured in the joints between the body and fenders as above-described, wings 62 and 63 overlie the fender and hood and body wall surfaces on opposite sides of the joint and grip them tightly in dust and waterproof engagement.

The novel features of this water and dust-tight joint and sealing strip are described and claimed in the United States Letters Patent of Henry V. Hedeen, No. 2,234,121 issued March 4, 1941, to which reference is made for further detail.

Each front fender 21 and 21' is thereby secured to the body front end in the manner described above so that the body and fender joints are identical at opposite sides of the body.

Although body unit 11 overhangs the front end of the chassis and is tightly bolted to fenders 21 and 21', the latter are not relied upon to support the body front end on the chassis. The body roof and side unit assemblies are so designed and of such strength that the overhanging load of the front end of the body is actually rigidly carried thereby without necessity for support from beneath.

However, by bolting the fenders directly to the body walls, the fenders are effectively incorporated as structural parts of the body, thereby strengthening it, and the rigidity of the body in turn serves to hold the fenders against weaving and prevent them from rattling and becoming noisy during operation of the vehicle. I find that the rigidly attached fenders tend to prevent flexing of the body front wall and windshield panel and generally stabilize the front end of the vehicle.

The above construction therefore embodies a new combination of vehicle elements which reenforce each other and cooperate to produce an efficient and sturdy vehicle.

*Body front end interior*

As illustrated in Figure 10, left front fender 21 serves as a flooring element at the left front corner of the body while the remainder of the front end flooring comprises mainly a plurality of sheet metal elements of suitable construction which can be speedily built into the vehicle after the body has been secured to the chassis.

These flooring elements comprise mainly an inclined outer toe board 71, a lower toe board 72, a combined toe board and engine cover unit 73, an inclined upper toe board 74, an elevated front floor unit 75 and an engine trap door 76 which is connected to floor unit 75 by piano hinges 77. A front floor support sill and panel assembly 78 (Figures 10 and 17) is provided at opposite ends with flanges 79 and 81 by which it is bolted or otherwise rigidly secured to opposite door posts 31 and 31'.

Outer toe board 71 (Figures 10, 20 and 21) has its inner edge 82 shaped to follow the contour of fender 21 and has a downturned outer flange 83 parallel to wall 46. At its rear end board 71 is secured to a ledge 84 on assembly 78 as by bolts 85. At its front end, board 71 is preferably apertured in alignment with a lug 54 of the body wall flange so as to be secured by a bolt assembly 57. Preferably, a sponge rubber strip 86 is compressed between flange 83 and adjacent wall 46 and a second sponge rubber strip 87 is compressed between board 71 and fender 21 along edge 82 for reducing body noises and sealing against entry of dirt and fumes.

Toe board 71 is effectively a substantial rearward continuation of the flooring surface of fender 21 and covers the depression caused by the sharp downward sweep of the rear end of fender 21.

Figures 20, 21, 22, 23, 24, 25, 26, 27:
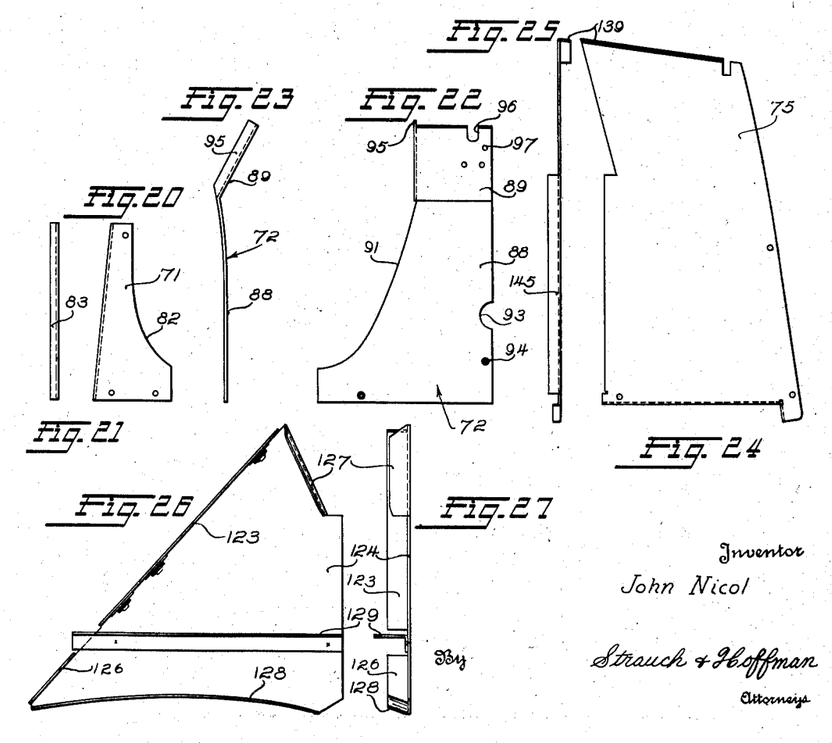
Figure 20 is a top plan view of the outer toe board interconnecting the front fender, body side wall and the assembly of Figure 17 at the left side of the body.
Figure 21 is a side elevation of the toe board of Figure 20.
Figure 22 is a top plan view of the lower toe board located between the left front fender and the unit of Figure 12.
Figure 23 is a side elevation of the toe board of Figure 22.
Figure 24 is a top plan view of the elevated front floor element within the right front corner of the body comprising part of the cargo platform.
Figure 25 is a side elevation of the floor element of Figure 24.
Figure 26 is a side elevation of the toe board support assembly at the right side of the vehicle.
Figure 27 is a front elevation of the assembly of Figure 26.

Lower toe board 72 (Figures 10, 22 and 23) comprises a rear section 88 and a sharply bent pedal section 89. As shown in Figure 23, rear section 88 is slightly bowed and has an arcuate outer edge 91 to follow the contour of fender 21. The rear end of toe board 72 is bolted at 92 (Figure 10) or similarly rigidly secured to ledge 84 of the sill assembly.

At its inner edge, rear section 88 is formed with a steering post aperture 93 and a fastener element aperture 94. Pedal section 89 is formed along its outer edge with a downturned flange 95 and at its forward end with a clutch pedal aperture 96. A fastener element aperture 97 is provided adjacent its inner edge.

The outer edge of board 72 is preferably spaced from fender 71 by a compressed strip of sponge rubber similar to that at 87. Toe board 72 is supported along its inner edge by underlying strips 98 and 99 (Figure 12) secured along the outer edge of unit 73 and provided with apertures 101 and 102 for receiving fastener elements passed through apertures 94 and 97 respectively.

Figure 12:
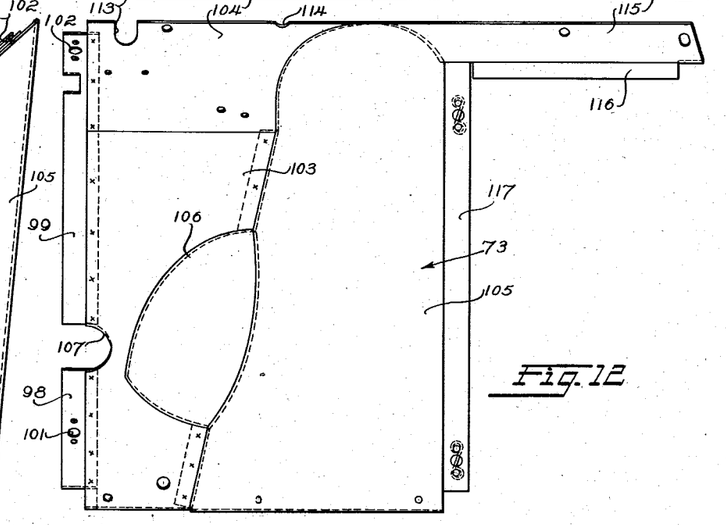
Figure 12 is a top plan view of the engine cover and floor unit.
Figures 13, 14, 15:
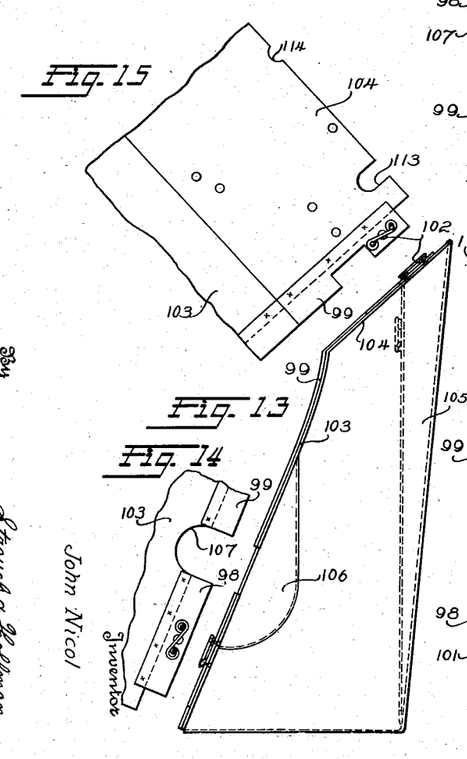
Figure 13 is a side elevation of the cover and floor unit of Figure 12.
Figure 14 is a projection of a portion of the cover and floor unit illustrating the steering post aperture.
Figure 15 is a projection of the forwardly disposed pedal section of the cover and floor unit of Figure 12.
Figure 16:
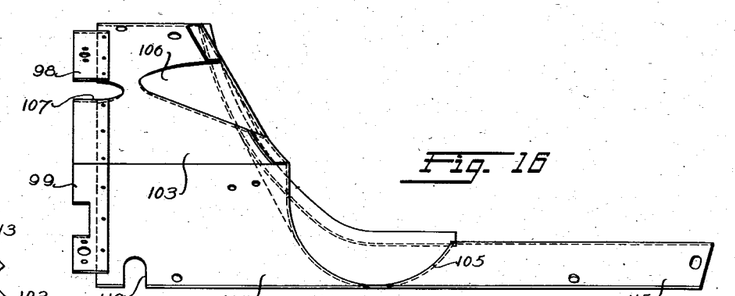
Figure 16 is a rear elevation of the cover and floor unit of Figure 12.

Unit 73 comprises mainly a floor portion having a rear section 103 and a sharply inclined pedal section 104 and an arcuate engine cover 105. An upwardly bulged section 106 is provided to clear the engine manifold below rear section 103. A steering post aperture 107, cooperating with aperture 93 of board 72, is provided between strips 98 and 99.

Along its rear edge, rear floor section 103 is secured as by bolt 108 to flange 84 of sill assembly 78, and engine cover 105 is secured as by bolts 109 to a flange 111 along the vertical floor support panel 112 of sill assembly 78. Flange 81 is preferably an integral extension of panel 112.

The forward edge of pedal section 104 is formed with a brake pedal aperture 113 and an accelerator pedal aperture 114. A narrow inclined toe board plate 115 comprising an integral part of unit 73 projects to the right of cover 105 parallel to pedal section 104 and is provided with a horizontal rear flange 116 which cooperates with a similar flange 117 integral with the outer side of cover 105 to support trap door 76 in closed position. Removable screws 118 or similar fastening elements are used to maintain trap door 76 closed.

Forwardly of flooring units 72 and 73, upper toe board 74 has secured beneath its rear end a rigid angle 119 (Figure 28) which underlies and supports the front edges of pedal sections 89 and 104 and plate 115 and is secured thereto as by fastening elements 121 (Figure 10).

The right end of toe board 74 is secured, as by bolts 122, upon the forwardly and upwardly inclined ledge 123 of the longitudinally disposed vertical support panel 124 illustrated in Figures 26 and 27. The outer end of plate 115 is similarly supported and secured as by bolt 125 above ledge 126 at the rear end of panel 124 (Figures 10 and 26.)

Panel 124 is anchored at its upper end as by welding integral flange 127 to the lower part of instrument board 50, and the lower end of panel 124 is flanged and shaped at 128 to lie along the surface of fender 21 to which it may be secured in a suitable manner if desired.

A support angle 129 has a leg integrally united as by welding to panel 124 and provides a ledge upon which the forward inner edge of cargo floor unit 75 rests as will presently be described. The left side of toe board 74 is supported by a vertical panel (not shown), substantially identical with panel 124 but omitting the support angle 129, and is secured thereto as by downturned flange 130 (Figure 29) and bolts 131 (Figure 10). Pedal section 89 of floor unit 72 also extends over this panel with flange 95 being suitably secured to the panel.

Toe board 74 is shaped at its forward end in accordance with the contour of front body wall 48 and is provided with an upturned flange 132 disposed along wall 48. Preferably flange 132 carries a strip of sponge rubber which is jammed against the inner surface of wall 48 during assembly and held there under compression when bolts 122 are tightened.

Toe board 74 (Figure 28) is formed with a cable aperture 133 and a hand brake lever aperture 134, an aperture for dimmer light switch button 135 (Figure 10), clutch and brake pedal apertures 136 and 137 respectively, and an accelerator pedal aperture 138.

Front floor unit 75 (Figures 10, 11, 24 and 25)

is formed with an upturned front edge flange 139 fitted to wall 48 from which it is separated by a strip of sponge rubber 141. The inner edge of floor 75 is supported by ledge 129, and the outer edge of floor 75 is secured as by bolts 142 upon a suitable horizontal brace angle 143 whose opposite ends are secured as by welding upon front body corner post 52 and adjacent door post 31'. Brace 143 is outwardly bowed similarly to strainer 45 and a sponge rubber strip 144 is compressed between brace 143 and adjacent body panel 46'.

A downturned flange 145 (Figure 25) along the rear inner edge of floor 75 provides a support for hinge 77. Floor 75 is supported along its rear edge by panel 112 and is secured to flange 111 thereof as by bolts 146.

Figures 17, 18, 19:
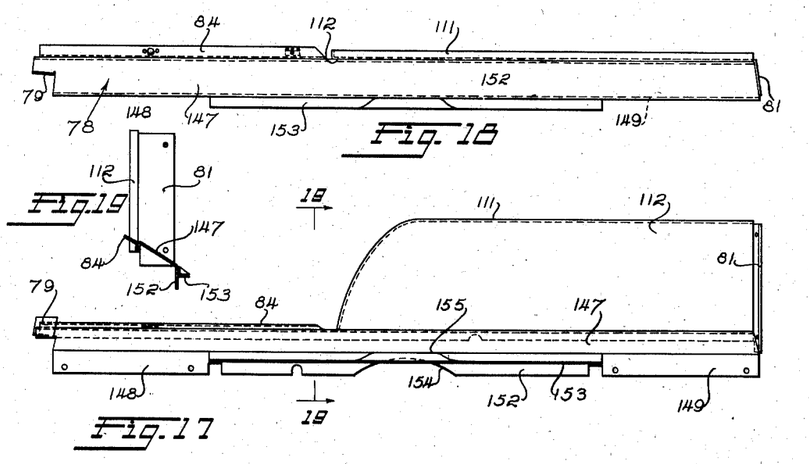
Figure 17 is a rear elevation of the front floor support sill and panel assembly unit which extends between the side door front posts.
Figure 18 is a top plan view of the sill and panel assembly of Figure 17.
Figure 19 is a section taken along line 19—19 of Figure 17.

Rearwardly of panel 112, sill assembly 78 of Figures 17 and 18 comprises a rearwardly and downwardly sloping ledge 147 which extends entirely across the body forwardly of the doorways and intermediate floor 41 and is provided at opposite ends with downturned integral flanges 148 and 149 which are secured as by bolts 150 and 151 to front panels 36 of the respective step wells.

Ledge 147 is formed with an intermediate downturned rear flange 152 (Figures 17-19) and a rigid angle 153 is secured as by welding to flange 152. The front edge of floor 41 projects beneath angle 153 (Figure 10) and is secured thereto by suitable fastener elements. Flange 152 is recessed at 154 and angle 153 is flattened intermediate its ends at 155 to clear the vehicle clutch housing beneath.

With reference to Figure 11, wherein sill assembly 78 and engine cover unit 73 are removed, fender 21' is tied directly to the chassis by a special Z-shaped reenforcing plate 156 having an upper flange 157 secured to the fender as by bolt 158 and a lower flange 159 secured to chassis rail 13 as by bolts 161. A similar reenforcing plate 160 (Figure 31) ties right front fender 21 to chassis rail 14.

As shown in Figure 11, fender skirt 170, supported along its upper edge by fender 21', is equipped with suitable vertical louvre openings 170' providing efficient engine ventilation. A similar fender skirt is secured to fender 21.

Floor unit 75, trap door 76 and the upper part of engine cover 105 provide a sturdy, readily accessible elevated cargo platform of large capacity at the right front end of the vehicle. Fender 21, outer toe board 71, lower toe board 72 and the outer portion of cover unit 73 provide a lower level body floor which slopes upwardly and forwardly from inclined ledge 147. The seated driver's feet are supported by this inclined floor. The flooring and other elements above described are inexpensive and easily and quickly installed. Moreover, these elements are resistant to wear and capable of standing up under the rough treatment to which they are subjected during normal commercial delivery practice.

*Controls*

Forwardly of the seated driver is the usual steering post 162, the location of which on the chassis has not been disturbed, with its upper end supported adjacent steering wheel 163 by a special bracket 164 bolted to the rear end of instrument board 50. A hand brake lever 165 of conventional type is also supported on bracket 164 so as to be accessible to the left hand of the seated driver.

Clutch pedal 166, brake pedal 167 and accelerator pedal 168 are disposed above the body floor forwardly of the seated driver. These pedals are located forwardly of the positions occupied by the usual control pedals on the stock chassis and the conversion employed to effect this arrangement will now be described with reference to Figures 2 and 30-35.

Figures 28, 29, 30, 31:
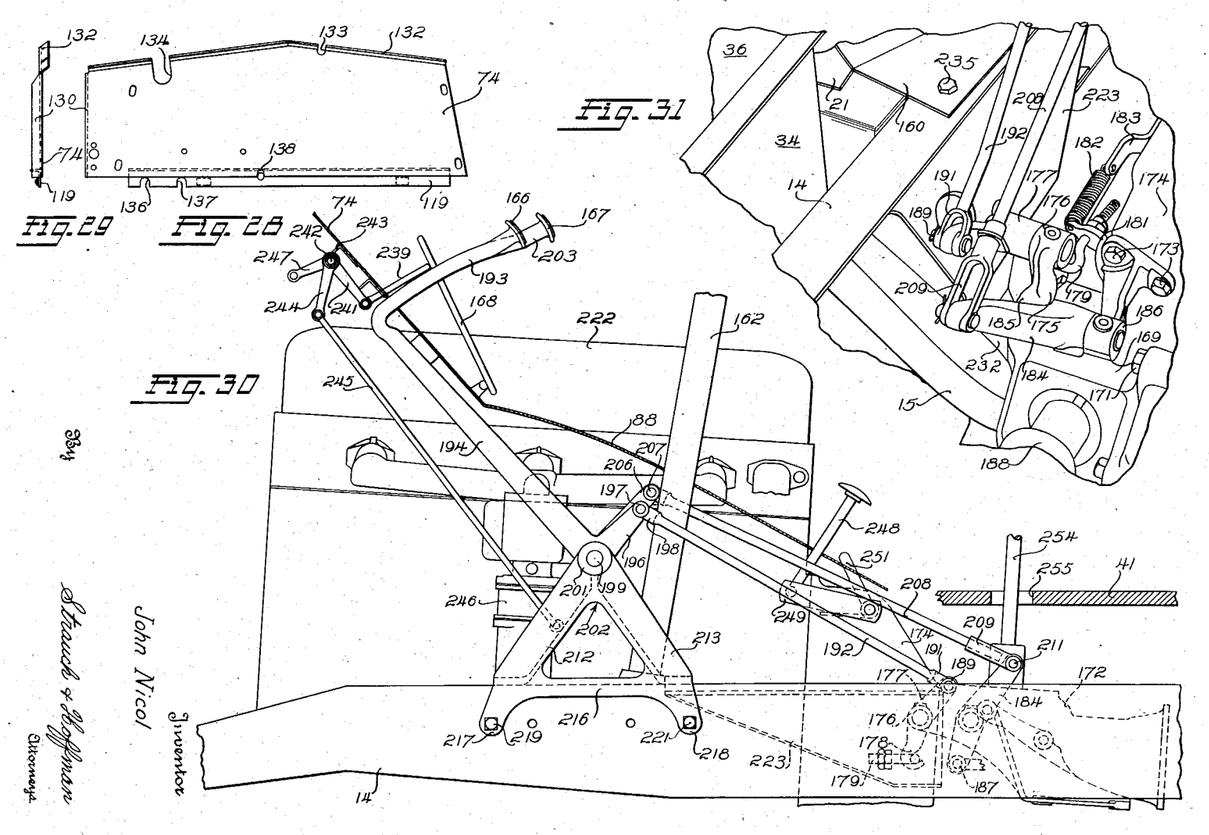
Figure 28 is a top plan view of the upper toe board assembly.
Figure 29 is a side elevation of the upper toe board assembly of Figure 28.
Figure 30 is an enlarged side elevation illustrating especially the bracket supporting the clutch and brake pedals forwardly of their conventional locations.
Figure 31 is a photographic view illustrating the manner in which the rods from the special pedals are connected to the usual clutch and brake controls.

Referring to Figure 31, a rigid bracket 169 is secured as by bolts 171 to transmission housing 172 and as by bolts 173 to clutch housing 174. Bracket 169 is provided with a forwardly projecting arm 175 having a hollow boss 176 which pivotally supports a lever 177 intermediate its ends. The lower end of lever 177 terminates in a hook 178 fitting within an eye bolt 179 rigid with a clutch operating lever 181. A clutch spring 182 anchored to housing 174 at 183 urges the clutch lever toward engaged position.

A brake operating lever 184 is pivoted intermediate its ends on bracket 169 between hollow bosses 185 and 186, and its lower end is pivotally connected at 187 to the piston of a hydraulic master service brake cylinder assembly 188 supported in the usual manner upon the chassis.

Bracket 169 is a conventional part of the stock chassis wherein the clutch pedal was pivotally mounted on boss 176 and the brake pedal was pivotally mounted between bosses 185 and 186. The brake cylinder piston is connected to lever 184 in the same manner that it was connected to the brake pedal on the stock chassis, and the clutch operating elements forwardly of lever 177 are conventional and connected to lever 177 in the same manner they were connected to the clutch pedal of the stock chassis.

The upper end of lever 177 is pivotally embraced at 189 by the bifurcated rear end 191 of a rod 192. Clutch pedal 166 is an integral unit comprising an arm 193 extending through floor apertures 96 and 136, an elongated bar 194 terminating in a hollow boss 195 and a shorter arm 196 generally parallel to lever 177 and upstanding from boss 195 and pivotally connected at 197 to the bifurcated front end 198 of rod 192.

Boss 195 is pivotally supported on a stub shaft 199 whose outer end is non-rotatably secured within a boss 201 at the apex of a triangular bracket 202 upstanding from chassis rail 14, so that pedal 166 is pivotally mounted on bracket 202 and connected through rod 192 and lever 177 to actuate the clutch of the vehicle.

Brake pedal 167 is an integral unit comprising an arm 203 extending through floor apertures 113 and 137, an elongated bar 204 terminating in a hollow boss 205 and a shorter arm 206 generally parallel to lever 184 and upstanding from boss 205 and pivotally connected at 207 to the bifurcated front end of a rod 208 at the opposite side of the steering post from rod 192. An adjustable clevis 209 on the rear end of rod 208 is pivotally connected at 211 to the upper end of lever 184.

Boss 205 is pivotally supported on stub shaft 199 inwardly of the clutch pedal so that brake pedal 167 is pivotally mounted on bracket 202 and connected to actuate the usual hydraulic braking mechanism.

Pedals 166 and 167 and the linkages connecting them to the clutch and brake operating mechanisms are of such length and design that manipulation of the pedals in the usual manner only is necessary for operation of the vehicle.

Bracket 202 is provided with inclined legs 212 and 213 rigidly secured upon rail 14 as by bolts 214 and 215 and at its outer side is formed with a depending integral flange 216 having end lugs 217 and 218 at the feet of legs 212 and 213 respectively and secured to the outer side of rail 14 as by bolts 219 and 221.

Bracket 202, which is a rigid, sturdy integral unit, is thereby securely fastened to rail 14, and flange 216 and lugs 217 and 218 cooperate with legs 212 and 213 to prevent lateral rocking of the bracket on the frame when pressure is applied to the pedals.

Bracket 202 is located alongside the engine 222 forwardly of the usual bracket mounting the lower end of the steering post and about midway between the ends of the engine.

Figure 32:
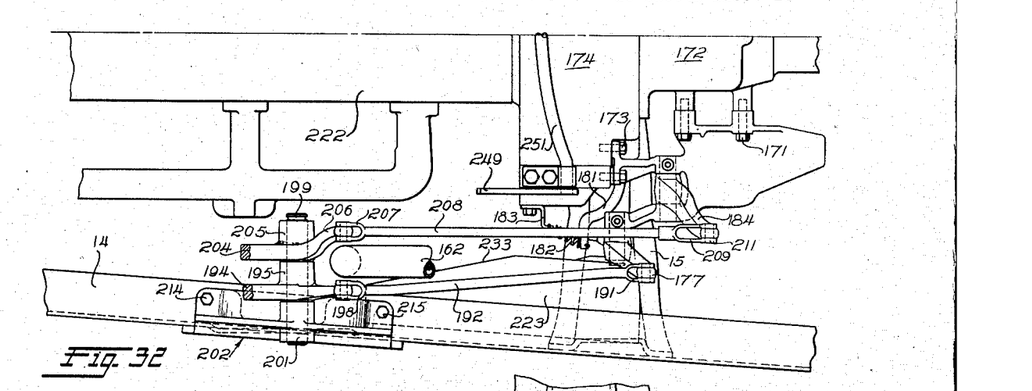
Figure 32 is a top plan view of the mechanism of Figure 30 showing further the special pedal bracket and the gusset plate for reenforcing the chassis rail on which the bracket is mounted.
Figures 33, 34:
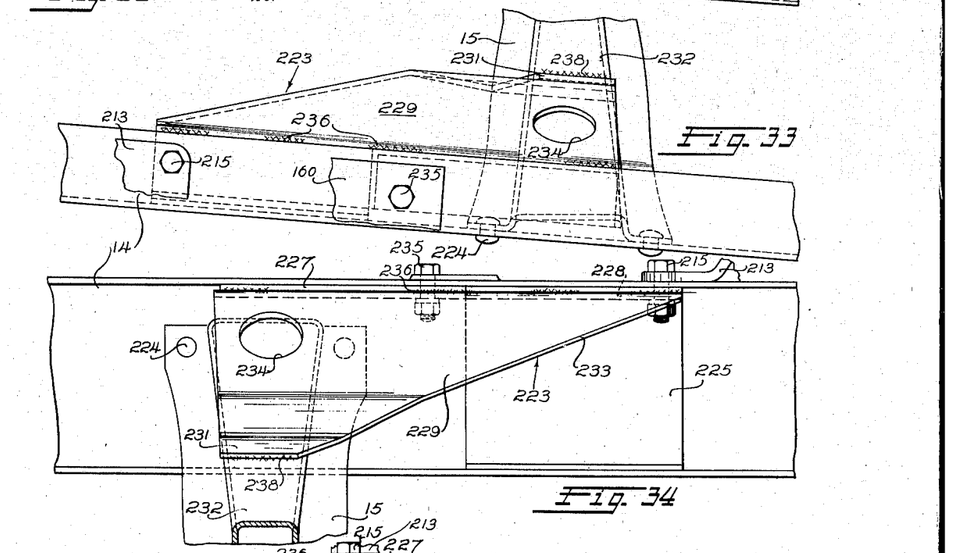
Figure 33 is an enlarged top plan view illustrating the chassis reenforcing gusset plate as mounted on the chassis.
Figure 34 is a side elevation of the gusset plate assembly of Figure 33.

As illustrated best in Figure 32, pedals 166 and 167 are supported on shaft 199 laterally inwardly of frame rail 14 so that when the driver steps on the pedals such pressure acting downwardly and to one side at the free upper end of bracket 202 sets up unbalanced forces tending to rock the bracket about frame rail 14 and inwardly of the chassis. This is especially true of the brake pedal which is subjected to greater pressure and higher reactive forces than the clutch pedal and is located furthest away from rail 14 so that it has greater leverage than the clutch pedal. Bracket 202 is itself so sturdy and its attachment to rail 14 so secure that the bracket is not deformed and remains rigid with rail 14 and these unbalanced forces are transmitted to frame rail 14.

Since bracket 202 upstands a substantial distance above rail 14 it is effectively a lever of considerable length by which the forces resulting from pressure of the pedals are amplified to exert a relatively powerful twisting effort on frame rail 14.

I have therefore provided reinforcing means bracing the chassis against such torsion. Preferably this reinforcing means comprises mainly a special gusset plate 223 illustrated best in Figures 2 and 33-35.

Chassis cross member 15 is secured to the inner side of channel shaped rail 14 as by the usual rivets 224. Forwardly of member 15, rail 14 is lined by a short channel section 225 whose upper leg 227 projects rearwardly along the underside of the leg of rail 14 to a point above the end of member 15. Channel section 225 is preferably welded, riveted or otherwise suitably secured to rail 14.

Gusset plate 223 is a short metal plate of about the same thickness as chassis rail 14 provided with a horizontal upper end flange 228 underlying leg 227, an inclined body section 229 and a suitably bent lower flange 231 adapted to traverse the upper surface 232 of member 15. Plate 223 is cut away along its inner edge 233 to clear the steering post mechanism and is provided with a circular aperture 234 above member 15 to permit access to the clutch linkage for repair and assembly.

At its forward end, plate flange 228 and leg 227 are apertured in alignment with an aperture in rail 14 to receive bolt 215 which thereby secures both pedal bracket leg 213 and the front end of the gusset plate to frame rail 14. A bolt assembly 235 (Figures 31 and 34) secures the lower end of plate 160 to rail 14 and the gusset plate.

Figure 35:
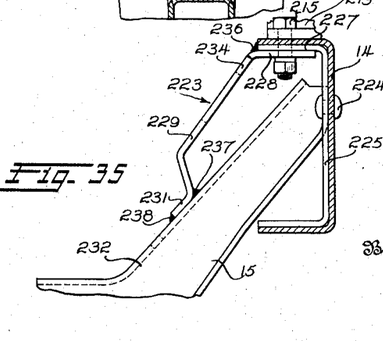
Figure 35 is a section illustrating the gusset plate secured between a main longitudinal chassis rail and a transverse chassis member.

Referring to Figure 35, plate 223 is welded directly to rail 14 as indicated at 236, and flange 231 is welded directly upon the upper surface of member 15 as indicated at 237 and 238. Plate 223 thereby provides an integral bridge between rail 14 and member 15 so that the above described torsion forces tending to twist rail 14 counterclockwise (Figure 35) as a result of pressing on the brake pedal are effectively resisted and counteracted by the rigidity of plate 223 and its connection with member 15.

An accelerator button 239 projects through floor apertures 114 and 138 and is pivotally connected to an arm 241 rigid with a shaft 242 pivotally supported on a bracket 243 secured upon the bottom surface of toe board 74. A second arm 244, also rigid with shaft 242, is pivotally connected to one end of a throttle rod 245, the latter being connected to operate the throttle valve of carburetor 246. Depression of pedal 168 thereby controls the engine throttle. A suitable hand throttle knob (not shown but accessible to the seated driver) is connected to arm 247 rigid with shaft 242.

Starter button 248 projects throuhg a hole in flooring 88 just forwardly of seat 42 and is conected at its lower end to a strap 249 (Figure 30) pivoted upon one end of a transverse rod 251. Rod 251 is pivotally supported on clutch housing 174 and extends across the chassis to be connected to operating linkage 252 of the engine starter assembly 253 (Figure 11). The starter operating linkage is unchanged from the stock chassis.

Rearwardly of the engine and conveniently beside the driver's seat, the usual transmission operating lever 254 projects upwardly through a suitable aperture 255 in floor 41.

Referring to Figure 11, signal horn 256 is supported on a bracket 257 secured to chassis rail 13 by the bolts 161 which also secure flange 159 of plate 156 to the chassis. Horn 256 is thereby accessible for repair and adjustment beneath trap door 76. Also conveniently accessible beneath trap door 76 are starter 253, distributor 258, oil filler pipe 259, and the oil stick gauge (not shown). Access to the generator located at the front left side of the engine, is gained by removing the left toe boards or through a suitable openable panel in the left fender skirt (not shown).

*Conversion and assembly*

In order to prepare a stock chassis 12 for body 11, the conventional clutch, brake and accelerator controls are removed and replaced by the controls and associated arrangements described above in connection with Figures 30-35. There is no alteration of the steering or transmission controls so that conversion of the controls, involving mainly securing bracket 202 and gusset plate 223 on the chassis and installation of the new control pedals and linkages, requires only a relatively short time.

Where the chassis are obtained in large numbers from the manufacturer, these altered controls may be built directly into the chassis to save the additional labor of conversion during assembly with the body.

With some stock chassis, it is necessary to cut away the rear ends of the front fenders, as indicated at 260 in Figure 11, to permit assembly of the step wells.

Hood 22 is then shortened and plates 156 and 160 installed to brace fenders 21 and 21'. No further material alteration of the chassis is then necessary.

The body unit, built as above described and with strips 59 and 59' attached, is lowered onto the chassis on an assembly line with rear wheel housings 39 located correctly upon the chassis, after which the rear portion of body 11 is secured to the chassis. Then the front body end is secured to fenders 21 and 21' by bolt assemblies 57, 57' and 58, and bracket 164 is secured to steering post 162.

Sill assembly 78 is then attached between posts 31 and 31', and intermediate floor 41 and the step wells are bolted to the body. After this the various toe board, engine cover and cargo platform elements are secured within the body front end as above described. Installation of brake 165, driver's seat 42 and door 37 substantially completes the assembly.

The above described manner of assembling the body upon the chassis is effective for adapting the body to chassis having a range of 10 inches in wheel bases. If necessary the toe boards and the other sheet metal elements within the body front end can be altered in shape and size to suit the chassis being fitted.

The vehicle of the invention is especially adapted for urban delivery service and the illustrated embodiment has a load space of approximately 290 cubic feet.

The body, which is of the all steel type of construction above described, is free from objectionable noises and the manner in which it is secured to the chassis provides a sturdy quiet vehicle which has a long operating life.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with a self-propelled vehicle stock chassis equipped with a forwardly disposed engine and its standard front fenders; an elongated substantially complete self-sustaining box-like body unit of large storage capacity constructed distinct from said chassis and adapted to seat directly upon said chassis with the front end thereof at least partly extending over said engine and overhanging said fenders; means securing said front end of the body directly upon said fenders so that the latter become rigid with the front end of the body, the lower ends of the front and side body walls being formed to follow the changing contour of the fender surfaces therebeneath; a side doorway opening to a low entrance floor within said body; an upstanding engine cover within said body forwardly of said doorway; an elevated cargo platform at one side of said engine cover forwardly of said doorway and said entrance floor so that said cargo platform is readily accessible to a driver standing on said floor; and a floor at the other side of said engine cover arranged at a lower level than said platform forwardly of said doorway.

2. In the vehicle defined in claim 1, the front fender at said other side of the engine cover serving as flooring for the adjacent front corner of said body.

3. In combination with a self-propelled vehicle stock chassis comprising the usual chassis frame supported by front and rear wheels and supporting an engine at its front end and being equipped with its usual front fenders disposed at opposite sides of said engine; a relatively long, rigid, substantially complete, self-sustaining box-like body unit constructed distinct from said chassis and adapted to seat directly upon said chassis, said body unit being of sufficient width to extend laterally over the rear wheels and being of sufficient length and width at its front end to extend forwardly over the greater portion of the engine and overhang the front fenders; and means securing said body unit to the chassis including means directly fastening the front and side body walls to the front fenders therebeneath, the lower ends of said body walls being formed to closely follow the changing contour of the fender surfaces therebeneath, and said fenders being thereby incorporated into the front end of the body unit.

JOHN NICOL.